US012759520B2

(12) United States Patent
Villegas Muriel et al.

(10) Patent No.: US 12,759,520 B2
(45) Date of Patent: Oct. 13, 2026

(54) DYNAMIC TORQUE REDISTRIBUTION FOR FRONT AND REAR SPLIT BRAKE SYSTEMS

(71) Applicant: Ford Global Technologies, LLC, Dearborn, MI (US)

(72) Inventors: Roberto Villegas Muriel, Atizapan de Zaragoza (MX); Thomas Svensson, Leichlingen (DE); Harold John Felch, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 16 days.

(21) Appl. No.: 19/088,216

(22) Filed: Mar. 24, 2025

(65) Prior Publication Data

US 2026/0285272 A1 Sep. 24, 2026

(51) Int. Cl.

| | |
|---|---|
| ***B60T 8/26*** | (2006.01) |
| ***B60T 8/17*** | (2006.01) |
| ***B60T 8/171*** | (2006.01) |
| ***B60T 8/172*** | (2006.01) |
| ***B60T 8/58*** | (2006.01) |

(52) U.S. Cl.

CPC .............. *B60T 8/26* (2013.01); *B60T 8/1701* (2013.01); *B60T 8/171* (2013.01); *B60T 8/172* (2013.01); *B60T 8/58* (2013.01); *B60T 2210/10* (2013.01); *B60T 2220/04* (2013.01); *B60T 2250/02* (2013.01); *B60T 2250/04* (2013.01)

(58) Field of Classification Search

CPC .......... B60T 8/26; B60T 8/1701; B60T 8/171; B60T 8/172; B60T 8/58; B60T 2210/10; B60T 2220/04

See application file for complete search history.

(56) References Cited

U.S. PATENT DOCUMENTS 2,906,561 A * 9/1959 Holton ...................... B60T 8/26 188/152
3,966,008 A * 6/1976 Klaue .................. F16D 65/853 180/370

(Continued)

FOREIGN PATENT DOCUMENTS

DE 102018220850 A1 6/2020
EP 0594860 A1 5/1994

(Continued)

*Primary Examiner* — George C Jin

(74) *Attorney, Agent, or Firm* — Burr & Forman; Lorne Forsythe

(57) ABSTRACT

A method of controlling brake usage of a vehicle may include determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, and determining whether a condition has been triggered for each parameter of the set of parameters based on the sensor data and the hierarchal classification. Responsive to the condition being triggered for any parameter of the set of parameters, the method may enable front and rear wheel braking, and responsive to no condition being triggered for the set of parameters, the method may enable only one of the front or rear wheel braking.

20 Claims, 5 Drawing Sheets

(56) References Cited

U.S. PATENT DOCUMENTS

| | | | | |
|---|---|---|---|---|
| 4,850,650 | A * | 7/1989 | Eckert | B60T 8/266 303/155 |
| 11,260,901 | B2 | 3/2022 | Yamaziki et al. | |
| 2017/0274877 | A1 * | 9/2017 | Wou | B60T 8/1766 |
| 2019/0299949 | A1 * | 10/2019 | Ying | B60T 8/1761 |
| 2022/0289155 | A1 * | 9/2022 | Lee | B60T 8/885 |
| 2024/0067143 | A1 * | 2/2024 | Cameron | B60T 8/17552 |
| 2024/0294150 | A1 * | 9/2024 | Yong | B60T 8/171 |

FOREIGN PATENT DOCUMENTS

| | | | |
|---|---|---|---|
| JP | 2020075621 | A | 5/2020 |
| JP | 7392355 | B2 | 12/2023 |
| WO | 2023001100 | A1 | 1/2023 |

* cited by examiner

DYNAMIC TORQUE REDISTRIBUTION FOR FRONT AND REAR SPLIT BRAKE SYSTEMS

TECHNICAL FIELD

Example embodiments generally relate to vehicle braking systems and, more particularly, relate to a system that enables the minimum braking system usage needed for the vehicle.

BACKGROUND

Vehicle braking inherently causes additional noise to passengers of the vehicle. Sometimes, the use of the entire braking system is not needed for rudimentary braking situations. In these rudimentary braking situations, selective use of the braking capabilities of the vehicle may be all that is required for stopping the vehicle.

However, current braking system architectures may not disengage portions of the braking system. Thus, it may be desirable to develop an architecture and control system that determines when and engages only a portion of the braking system under desired conditions based on vehicle and environmental data.

BRIEF SUMMARY OF SOME EXAMPLES

In accordance with an example embodiment, a method of controlling brake usage of a vehicle may be provided. The method may include determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, and determining whether a condition has been triggered for each parameter of the set of parameters based on the sensor data and the hierarchal classification. Responsive to the condition being triggered for any parameter of the set of parameters, the method may enable front and rear wheel braking, and responsive to no condition being triggered for the set of parameters, the method may enable only one of the front or rear wheel braking.

In another example embodiment, a vehicle control system of a vehicle may therefore be provided. The vehicle control system may include a front brake assembly operably coupled to a front wheel assembly of the vehicle, a rear brake assembly operably coupled to a rear wheel assembly of the vehicle, and a controller configured to execute a method of controlling the front brake assembly and the rear brake assembly. The method may further include determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, and determining whether a condition has been triggered for each parameter of the set of parameters based on the sensor data and the hierarchal classification. Responsive to the condition being triggered for any parameter of the set of parameters, the method may enable front and rear wheel braking, and responsive to no condition being triggered for the set of parameters, the method may enable only one of the front or rear wheel braking.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
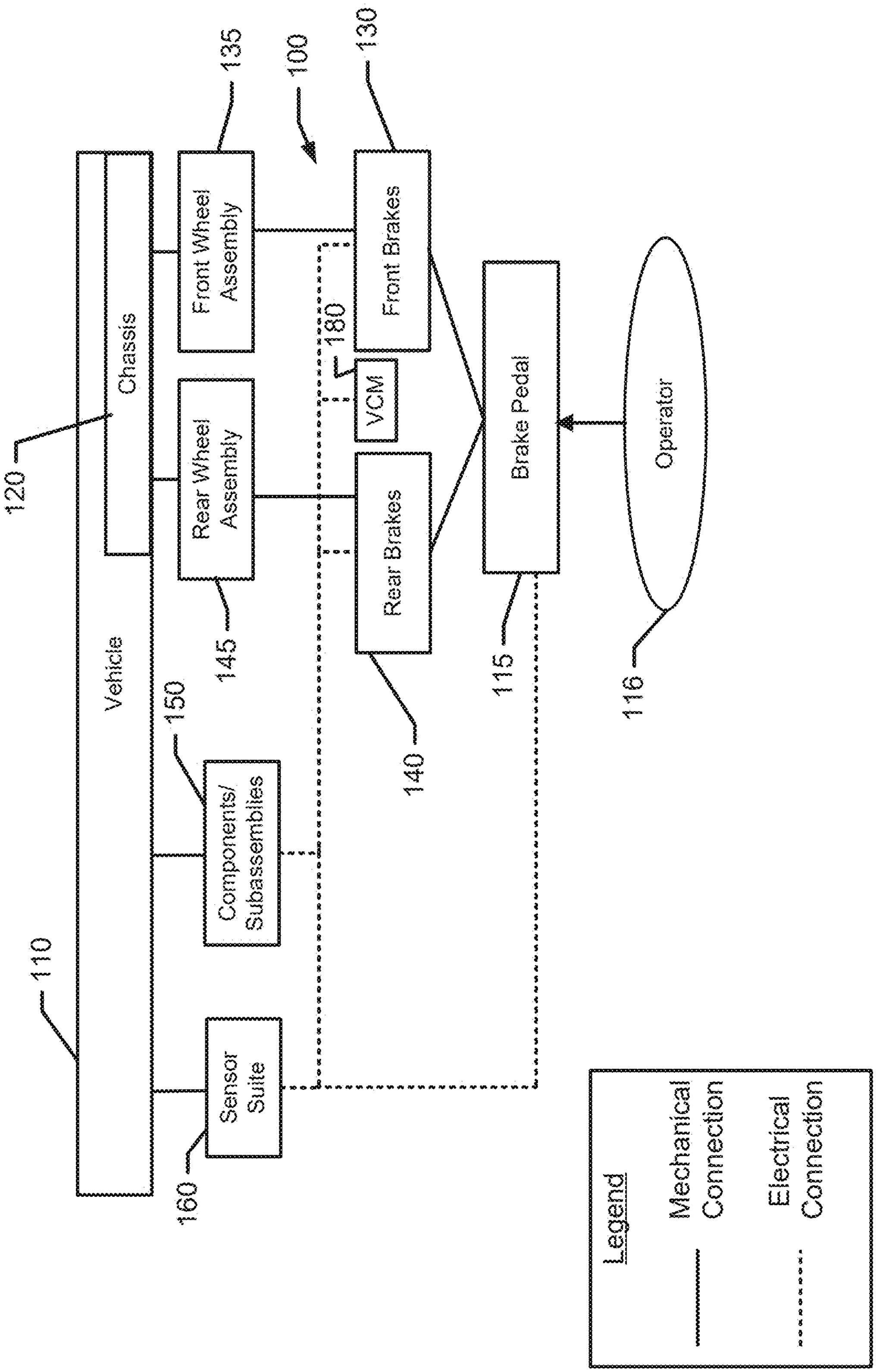
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about" and "substantially" should be understood to be definite approximations that account for variations in measurements that cannot be, or as one of skill in the art would appreciate, normally are not, measured precisely. Thus, for example, a parameter that is "about" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Some example embodiments described herein may address the issues described above. In this regard, for example, some embodiments may provide a vehicle control system to increase vehicle functionality. As a result, the vehicle control system may control brake usage to augment the vehicle performance and comfort.

FIG. 1 illustrates a block diagram of a vehicle control system 100 of an example embodiment. The components of the vehicle control system 100 may be incorporated into a vehicle 110 (e.g., via being operably coupled to a chassis 120 or frame of the vehicle 110, various components of the vehicle 110 and/or electronic control systems of the vehicle 110). Of note, although the components of FIG. 1 may be operably coupled to the vehicle 110, it should be appreciated that such connections may be either direct or indirect.

Moreover, some of the components of the vehicle control system 100 may be connected to the vehicle 110 via intermediate connections to other components either of the chassis 120 or of other electronic and/or mechanical systems or components. In some cases, the chassis 120 may include or be defined by a frame, and the frame may additionally be formed of one or more casted subframes.

The vehicle control system 100 may include one or more input devices in the form of one or more control pedals. In some embodiments, the control pedals may include a brake pedal 115 that is generally foot operated by an operator 116 to initiate braking forces or braking torque application at the wheels of the vehicle 110. The brake pedal 115 may be operably coupled to front brakes 130 via mechanical coupling. In an example embodiment, the front brakes 130 may be hydraulic brakes operably coupled to a front brake assembly 135, and the brake pedal 115 may be hydraulically coupled to the front brakes 130. The brake pedal 115 may also be operably coupled to rear brakes 140. In some cases, the rear brakes 140 may be electro-mechanical brakes (EMBs) operably coupled to a rear wheel assembly 145. The front brakes 130 and the rear brakes 140 may be operably coupled to a pedal travel sensor of a sensor suite 160 of the vehicle 110 to receive position and angle information indicative of the brake pedal 115. The pedal travel sensor may provide data indicative of the precise actuation and the precise angle of the brake pedal 115 to help determine desired braking degree of the operator 116.

In an example embodiment, the sensor suite 160 may include vehicle sensors and environment sensors, and the sensor suite 160 may provide sensor data for the vehicle 110. The vehicle sensors may monitor status and performance of various vehicle components/subassemblies 150 or the overall state of the vehicle 110 as a whole. For example, the vehicle sensors may include but are not limited to vehicle speed sensors, wheel speed sensors, vehicle weight sensors, accessory attachment sensors, vehicle mode sensors, brake torque sensors, brake torque rate sensors, tire pressure monitoring sensors, vehicle pitch sensors, and pedal sensors. The environment sensors may include but are not limited to temperature sensors, driving surface grade sensors, driving surface detection sensors, and precipitation sensors. In an example embodiment, the sensor data provided by the sensor suite 160 may be provided as inputs to a vehicle control module (VCM) 180. In some cases, the sensor data may be provided as inputs to other vehicle control modules directly or to other vehicle control modules. The sensor data may be provided to the vehicle control system 100 to enable the vehicle control system 100 to control usage of the front brakes 130 and the rear brakes 140.

In an example embodiment, the VCM 180 may be a controller. In some cases, the VCM 180 may include one or more control modules (i.e., sub-control modules or operably coupled to other control modules). The VCM 180 may include processing circuitry that includes a processor and memory. The processing circuitry may be configured to provide electronic control of the inputs to one or more functional units of the front brakes 130 or the rear brakes 140 and to process data received at or generated by the one or more functional units of the front brakes 130 or the rear brakes 140. Thus, the processing circuitry may be configured to perform data processing, control function execution and/or other processing and management services according to an example embodiment. In some embodiments, the processing circuitry may be embodied as a semiconductor chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, other vehicle control modules may include similar processing circuitry.

Figure 2:
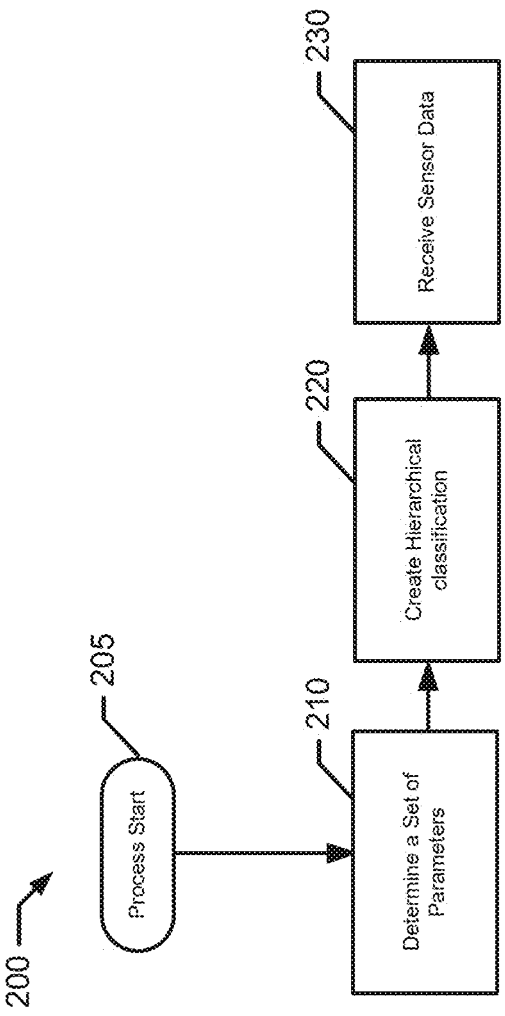
FIG. 2 depicts a flow chart of an algorithm for a VCM that forms an initial set of parameters to determine a usage of the front brakes and the rear brakes in accordance with an example embodiment.

FIG. 2 illustrates a flow chart of an algorithm for a VCM that forms an initial set of parameters to determine a usage of the front brakes and the rear brakes in accordance with an example embodiment. The VCM 180 may be configured to execute an initial algorithm 200 for forming a set of parameters to determine a usage of the front brakes 130 and the rear brakes 140 which may begin at step 205 (process start). The start of the algorithm 200 may be triggered by ignition or initial starting of the vehicle 110. In some cases, the algorithm 200 may be triggered responsive the vehicle 110 shifting out of specific gear (e.g. shifting out of park). In an example embodiment, the algorithm 200 may also be executed periodically to form a new set of parameters or ensure the proper parameters are present.

After the algorithm 200 starts at step 205, the algorithm 200 may determine a set of parameters based on vehicle data and environmental data at step 210. Vehicle data may include but is not limited to the vehicle model or type, the accessories attached or configured to be attached to the vehicle (e.g. a trailer attachment), vehicle component status, and the available sensors of the sensor suite 160 available to provide data to the VCM 180. Environmental data may include but it not limited to weather forecasts, temperature data, and historical environment data (e.g. seasonal weather trends, etc.). Utilizing the vehicle data and the environmental data, the VCM 180 and the algorithm 200 may determine which parameters would have an effect on vehicle stopping distance for the specific vehicle. In this regard, if the vehicle 110 is a truck or larger vehicle, whether a trailer is attached may be part of the set of parameters and may not be part of the set of parameters for a smaller vehicle not configured for towing. Some parameters (e.g. vehicle speed) may be shared across all vehicle types and models due to the parameter's importance to vehicle stopping distance.

In some cases, the set of parameters may include a wide variety of parameters that are tied to the vehicle 110 itself and the environment/conditions outside of the vehicle 110. Some sample parameters of the set of parameters may include but are not limited to vehicle speed, vehicle weight, accessories attached to the vehicle 110 (e.g. trailer), surface conditions of the driving surface of the vehicle 110, component status (e.g. brake status, tire pressure, etc.), road grade, vehicle pitch, brake pedal actuation, brake pedal travel, brake torque request, temperature, and precipitation.

After determination of the set of parameters for the vehicle 110, the VCM 180 may create a hierarchical classification of the set of parameters at step 220. The hierarchical classification of the set of parameters may be based on an effect of each parameter of the set of parameters on vehicle stopping distance. The effect of each parameter on the vehicle stopping distance may be vehicle type or model specific. In some cases, lookup tables and databases may be used to determine the hierarchical classification of the set of parameters for each vehicle 110. In some cases, vehicle speed may be the first parameter in the hierarchical classification, as regardless of the other parameters within the set of parameters, if the vehicle speed is above a specific threshold amount, the vehicle control system may need full braking capabilities. Similarly, if the vehicle speed is above a specific threshold amount, the vehicle control system may not need to check another parameter like driving surface conditions, and thus driving surface conditions may be lower with the hierarchical classification.

In some cases, after creation of the hierarchical classification at step 220, the VCM 180 may start or continue to receive the sensor data from the sensor suite 160 at step 230. In this regard, the VCM 180 may begin to monitor the set of parameters determined in step 210 according to the hierarchical classification created in step 220 via the sensor data received for the sensor suite 160. In an example embodiment, the sensor suite 160 may run continuously, but the sensor suite 160 may not continuously transmit the sensor data to the VCM 180 or the VCM 180 may not always require the most recent sensor data. Receiving sensor data at step 230 of the algorithm 200 may also signify the finishing of the hierarchical classification. In some cases, the VCM 180 may receive the sensor data automatically and in real time, and the VCM 180 may execute the algorithm 200 automatically and in real time.

Figure 3:
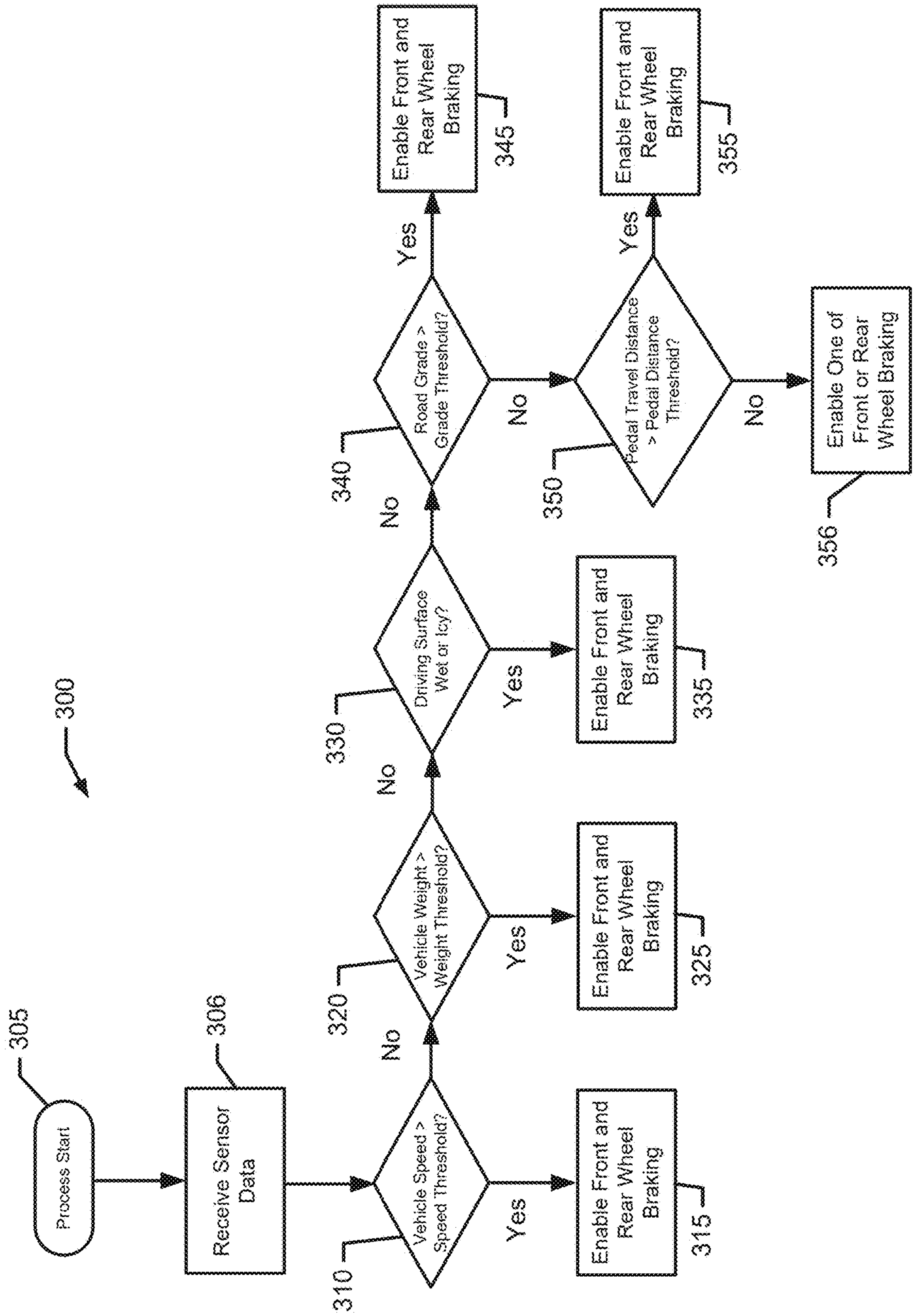
FIG. 3 illustrates a block diagram of physical boundary diagram featuring an EBB module associated with braking control in accordance with an example embodiment in accordance with an example embodiment.

FIG. 3 illustrates a flow chart of an algorithm for a VCM that monitors the set of parameters according to the hierarchical classification to determine a usage of the front brakes and the rear brakes in accordance with an example embodiment. The VCM 180 may be configured to execute an algorithm 300 after the algorithm 200. In some cases, the algorithm 200 and the algorithm 300 may be a single algorithm configured to be executed by the VCM 180. The start of algorithm 300 at step 305 may be responsive to a change in or a trigger from the vehicle 110. For example, responsive to the vehicle 110 switching gear into reverse or switching out of park, the VCM 180 may receive sensor data at step 306. In an example embodiment, step 306 and step 230 may be the same. Similar to step 230, the sensor suite 160 may continually collect the sensor data and only transmit/transfer the sensor data when needed by the VCM 180 and/or the algorithm 300.

In an example embodiment, the algorithm 300 may then determining whether a condition is triggered for each parameter of the set of the parameters based on the sensor data and the hierarchical classification. In this regard, each parameter may have its own, separate condition, and an order of determining whether each condition has been triggered follows the hierarchical classification. In an example embodiment, the first parameter of the hierarchical classification and thus the first parameter monitored by the algorithm 300 may be vehicle speed. The VCM 180 may determine via the sensor data whether the vehicle speed is greater than a speed threshold at step 310. The speed threshold may be dependent on vehicle type and model, as well as the vehicle accessories (e.g. tire type, brake conditions, etc.). If the vehicle speed is determined to be greater than the speed threshold at step 310, the VCM 180 may enable both the front brakes 130 and the rear brakes 140 at step 315.

If the vehicle speed is determined to not be greater than the speed threshold at step 310, the VCM 180 and the algorithm 300 may proceed to determining whether a second parameter in the hierarchical classification of the set of parameters triggers a condition at step 320. In some cases, the second parameter may be vehicle weight, and the VCM 180 may determine based on the sensor data whether the vehicle weight is greater than a weight threshold. The weight threshold may be vehicle specific, and a vehicle weight sensor may provide the sensor data to determine if the vehicle 110 is over the weight threshold. In some cases, the weight threshold may be triggered via determination of specific vehicle attachments. For example, if the VCM 180 determines a trailer is operably coupled to the vehicle 110, the weight threshold may automatically be triggered. Responsive to the condition of the second parameter of the hierarchical classification being triggered due to the vehicle weight being greater than the weight threshold, the VCM 180 may enable both the front brakes 130 and the rear brakes 140 at step 325.

If the vehicle weight is determined to not be greater than the weight threshold at step 320, the VCM 180 and the algorithm 300 may proceed to determining whether a third parameter in the hierarchical classification of the set of parameters triggers a condition at step 330. In some cases, the third parameter may be driving surface conditions for the vehicle 110, and the condition of the third parameter may be whether the driving surface is wet or icy. The VCM 180 may determine if the driving surface is wet or icy via numerous different methods. For example, in an example embodiment, the VCM 180 may check a driving mode of the vehicle 110. If the driving mode of the vehicle is set for wet or icy conditions, the condition for the third parameter may be triggered. The operator 116 of the vehicle 110 may set the driving mode or the VCM 180 may automatically set the driving mode based on the sensor data of the sensor suite 160.

The VCM 180 may automatically determine if the driving surface is wet or icy based on the sensor data from a combination of sensors of the sensor suite 160. For example, the VCM 180 may determine if the driving surface is wet or icy utilizing a temperature sensor and/or a precipitation sensor. In another example, the VCM 180 may use the combination of sensors and the sensor data to determine if the driving surface is wet or icy using a estimation of the coefficient of friction ($\mu$) of the driving surface. Responsive to the triggering of the condition of the third parameter of the hierarchical classification due to the VCM 180 determining the driving surface is wet or icy, the VCM 180 may enable both the front brakes 130 and the rear brakes 140 at step 335.

If the driving surface is determined to not be wet or icy at step 330, the VCM 180 and the algorithm 300 may proceed to determining whether a fourth parameter in the hierarchical classification of the set of parameters triggers a condition at step 340. In some cases, the fourth condition may be road grade, and the fourth condition may be whether the road grade is greater than a road grade threshold. The VCM 180 may determine road grade of the vehicle 110 via vehicle pitch or via a road grade sensor. In some cases, a camera may be included within the sensor suite 160, and the VCM 180 may utilize the camera footage to estimate road grade. The road grade threshold may vary by vehicle type and model. Responsive to the triggering of the condition of the fourth parameter of the hierarchical classification due to the VCM 180 determining the road grade is greater than the grade threshold, the VCM 180 may enable both the front brakes 130 and the rear brakes 140 at step 445.

If the road grade is determined to not be greater than the grade threshold at step 340, the VCM 180 and the algorithm 300 may proceed to determine whether a fifth parameter in the hierarchical classification of the set of parameters triggers a condition at step 350. In some cases, the fifth parameter may be a pedal travel distance, and the condition of the fifth parameter may be whether the pedal travel distance is greater than a pedal distance threshold. Pedal travel distance may correspond the distance the brake pedal 115 travels in response to an input of the operator 116. The pedal travel distance may further correspond to the amount of braking torque desired by the operator 116. In this regard, the greater the pedal travel distance, the greater the braking torque request. In some cases, pedal travel distance may correspond to a deceleration request for the vehicle 110, and whether a deceleration request is greater than a deceleration request threshold (e.g. 0.1 g or 0.3 g) may correspond to the condition for the fifth parameter. Responsive to the triggering of the condition of the fifth parameter of the hierarchical classification due to the VCM 180 determining the pedal travel distance is greater than the pedal distance threshold, the VCM 180 may enable both the front brakes 130 and the rear brakes 140 at step 355. If the condition of the fifth parameter is not triggered, the VCM 180 may enable only the front brakes 130 or the rear brakes 140 at step 356.

Figure 4:
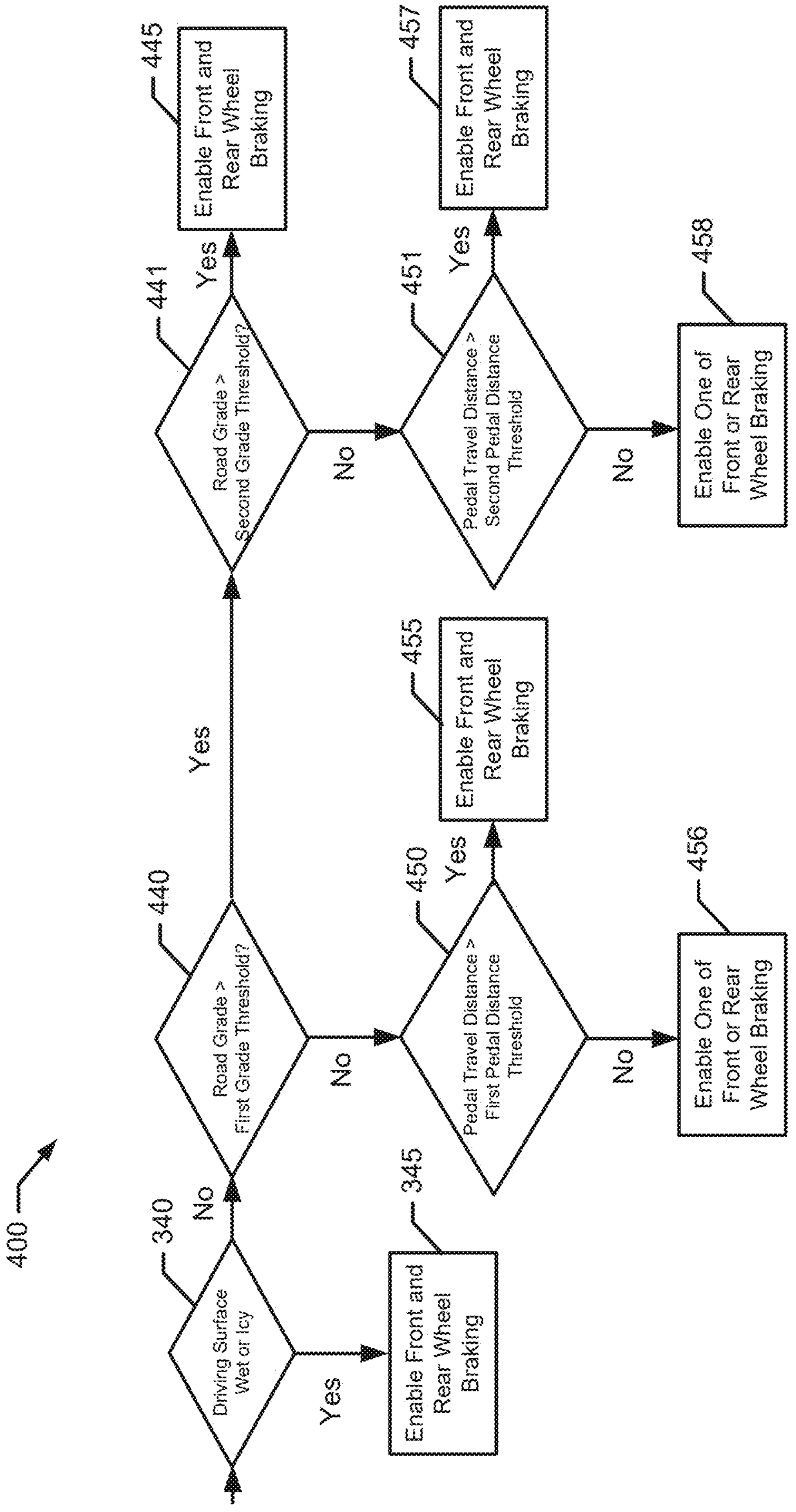
FIG. 4 depicts a flow chart of an algorithm for a VCM that monitors the set of parameters according to the hierarchical classification to determine a usage of the front brakes and the rear brakes in accordance with an example embodiment.

FIG. 4 illustrates a flow chart of an algorithm for a VCM that monitors the set of parameters according to the hierarchical classification to determine a usage of the front brakes and the rear brakes in accordance with an example embodiment. In some cases, the fourth parameter and the fifth parameter within the algorithm 300 may expand to include multiple thresholds for each parameter as seen in algorithm 400. For example, as seen in FIG. 4 and algorithm 400, the step 340 of algorithm 300 regarding determining whether road grade is greater than a grade threshold may be replaced with step 440 and step 441. The VCM 180 may first determine if road grade is greater than a first grade threshold at step 440, and responsive to the road grade being greater than a first grade threshold, the VCM 180 may further determine if the road grade is greater than a second grade threshold at step 441. Then, responsive to the road grade being greater than a second grade threshold, the VCM 180 may enable both the front brakes 130 and the rear brakes 140 at step 445. In some cases, the second grade threshold is greater than the first grade threshold. For example, the first grade threshold may be 5 percent, and the second road grade threshold may be 10%.

In an example embodiment, similarly to algorithm 300, if the VCM 180 determines the road grade to not be greater than the first grade threshold, the VCM 180 may determine whether the pedal travel distance is greater than a first pedal distance threshold at step 450. Responsive to the VCM 180 determining the pedal travel distance is greater than the first pedal distance threshold, the VCM 180 may enable both the front brakes 130 and the rear brakes 140 at step 455. If the pedal travel distance is not greater than the first pedal travel distance threshold, the VCM 180 may enable only the front brakes 130 or the rear brakes 140 at step 456.

Responsive to the VCM 180 determining the road grade to be greater than the first grade threshold but not greater than the second grade threshold, the VCM 180 may determine whether the pedal travel distance is greater than a second pedal distance threshold at step 450. Responsive to the VCM 180 determining the pedal travel distance is greater than the second pedal distance threshold, the VCM 180 may enable both the front brakes 130 and the rear brakes 140 at step 457. If the pedal travel distance is not greater than the second pedal travel distance threshold, the VCM 180 may enable only the front brakes 130 or the rear brakes 140 at step 458.

In some cases, the first pedal distance threshold and the second pedal distance threshold are related to the first grade threshold and the second grade threshold. For example, if the first grade threshold is smaller than the second grade threshold, then the first pedal distance threshold may be greater than the second pedal distance threshold. In this regard, as the grade increases, the lower the pedal distance threshold may be to keep the same vehicle stopping distance.

In an example embodiment, additional parameters may be added to or replace previous parameters within the set of parameter. For example, brake pad status may be an additional parameter, and the condition for the brake pad status parameter may include whether brake pad wear is above a brake pad wear threshold. In some cases, responsive to the brake pad wear being greater than a brake pad wear threshold, the VCM 180 may enable both the front brakes 130 and the rear brakes 140. In an example embodiment, brake pad status may be the first parameter or an early parameter within the hierarchical classification, as brake pad status has a significant effect on vehicle stopping distance.

As previously stated, the thresholds used for determining the triggering of the conditions may be vehicle specific and based on vehicle model or vehicle. In some cases, the thresholds used may correspond to ASIL ratings. For example, the speed threshold for the vehicle 110 may be determined based on a maximum speed for only front or rear wheel braking according ASIL ratings.

Figure 5:
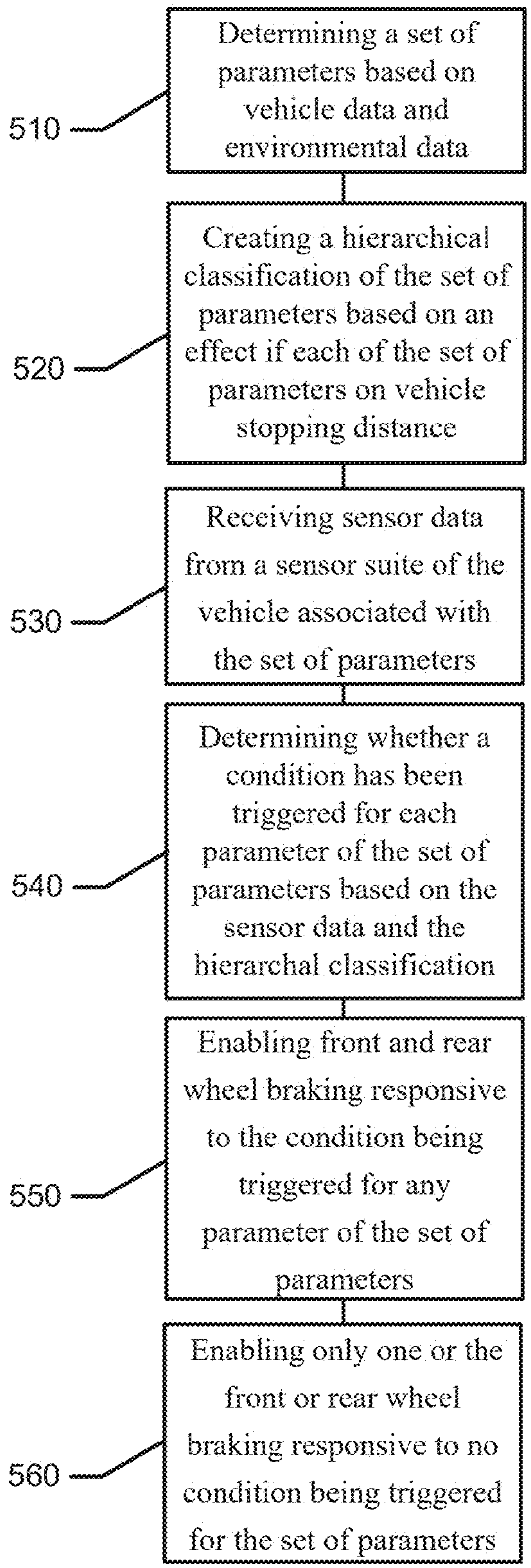
FIG. 5 illustrates a method of controlling brake usage in accordance with an example embodiment.

FIG. 5 depicts a method for controlling brake usage of the vehicle in accordance with an example embodiment. At step 510, the method may determine a set of parameters based on vehicle data and environmental data. At step 520, the method may further create a hierarchical classification of the set of parameters based on an effect if each of the set of parameters on vehicle stopping distance. At step 530, the method may receive sensor data from a sensor suite of the vehicle associated with the set of parameters. At step 540, the method may determine whether a condition has been triggered for each parameter of the set of parameters based on the sensor data and the hierarchal classification. At step 550, the method may enable front and rear wheel braking responsive to the condition being triggered for any parameter of the set of parameters. At step 560, the method enable only one of the front or rear wheel braking responsive to no condition being triggered for the set of parameters.

A method of controlling brake usage of a vehicle may therefore be provided. The method may include determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, and determining whether a condition has been triggered for each parameter of the set of parameters based on the sensor data and the hierarchal classification. Responsive to the condition being triggered for any parameter of the set of parameters, the method may enable front and rear wheel braking, and responsive to no condition being triggered for the set of parameters, the method may enable only one of the front or rear wheel braking.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the determining the set of parameters and the creating the hierarchical classification may be further based on a lookup table specific to a vehicle type or vehicle model. In some cases, vehicle speed may be a first parameter in the hierarchical classification of the set of parameters, and whether the vehicle speed is greater than a speed threshold may be the condition for the first parameter. In an example embodiment, vehicle weight may be a second parameter in the hierarchical classification of the set of parameters, and whether the vehicle weight is greater than a weight threshold may be the condition for the second parameter. In some cases, the vehicle weight may include determining whether a trailer attachment is operably coupled to the vehicle, and responsive to the trailer attachment being operably coupled to vehicle, the weight threshold may be triggered. In an example embodiment, a status of a driving surface of the vehicle may be a third parameter in the hierarchical classification of the set of parameters, and whether the status of the driving surface is wet or icy may be the condition of the third parameter. In some cases, whether the status of the driving surface is wet or icy may be based on a vehicle mode currently in use by the vehicle. In an example embodiment, the status of the driving surface is wet or icy may be based on a coefficient of friction of the driving surface. In some cases, the status of the driving surface is wet or icy may be based on a precipitation measurement. In an example embodiment, a road grade may be a fourth parameter in the hierarchical classification of the set of parameters, and whether the road grade is greater than a grade threshold may be the condition for the fourth parameter. In some cases, a brake pedal travel distance may be a fifth parameter in the hierarchical classification of the set of parameters, and whether brake pedal travel distance is greater than a pedal distance threshold may be the condition for the fifth parameter.

In another example embodiment, a vehicle control system of a vehicle may therefore be provided. The vehicle control system may include a front brake assembly operably coupled to a front wheel assembly of the vehicle, a rear brake assembly operably coupled to a rear wheel assembly of the vehicle, and a controller configured to execute a method of controlling the front brake assembly and the rear brake assembly. The method may further include determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, and determining whether a condition has been triggered for each parameter of the set of parameters based on the sensor data and the hierarchal classification. Responsive to the condition being triggered for any parameter of the set of parameters, the method may enable front and rear wheel braking, and responsive to no condition being triggered for the set of parameters, the method may enable only one of the front or rear wheel braking.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A method of controlling brake usage of a vehicle, the method comprising:

determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, determining whether a condition has been triggered for each parameter of the set of parameters based on the sensor data and the hierarchal classification, responsive to the condition being triggered for any parameter of the set of parameters, enabling front and rear wheel braking, and responsive to no condition being triggered for the set of parameters, enabling only one of the front or rear wheel braking.

2. The method of claim 1, wherein the determining the set of parameters and the creating the hierarchical classification is further based on a lookup table specific to a vehicle type or vehicle model.

3. The method of claim 1, wherein vehicle speed is a first parameter in the hierarchical classification of the set of parameters, and wherein whether the vehicle speed is greater than a speed threshold is the condition for the first parameter.

4. The method of claim 3, wherein vehicle weight is a second parameter in the hierarchical classification of the set of parameters, and wherein whether the vehicle weight is greater than a weight threshold is the condition for the second parameter.

5. The method of claim 4, wherein the vehicle weight includes determining whether a trailer attachment is operably coupled to the vehicle, and wherein responsive to the trailer attachment being operably coupled to vehicle, the weight threshold is triggered.

6. The method of claim 4, wherein a status of a driving surface of the vehicle is a third parameter in the hierarchical classification of the set of parameters, and wherein whether the status of the driving surface is wet or icy is the condition of the third parameter.

7. The method of claim 6, wherein whether the status of the driving surface is wet or icy is based on a vehicle mode currently in use by the vehicle.

8. The method of claim 6, wherein the status of the driving surface is wet or icy is based on a coefficient of friction of the driving surface.

9. The method of claim 6, wherein the status of the driving surface is wet or icy is based on a precipitation measurement.

10. The method of claim 6, wherein a road grade is a fourth parameter in the hierarchical classification of the set of parameters, and wherein whether the road grade is greater than a grade threshold is the condition for the fourth parameter.

11. The method of claim 10, wherein a brake pedal travel distance is a fifth parameter in the hierarchical classification of the set of parameters, and wherein whether brake pedal travel distance is greater than a pedal distance threshold is the condition for the fifth parameter.

12. A vehicle control system of a vehicle, the vehicle control system comprising:

a front brake assembly operably coupled to a front wheel assembly of the vehicle, a rear brake assembly operably coupled to a rear wheel assembly of the vehicle, and a controller configured to execute a method of controlling the front brake assembly and the rear brake assembly, the method further comprising:

determining a set of parameters based on vehicle data and environmental data, creating a hierarchical classification of the set of parameters based on an effect of each of the set of parameters on vehicle stopping distance, receiving sensor data from a sensor suite of the vehicle associated with the set of parameters, determining whether a condition has been triggered for each parameter of the set of parameters based on the sensor data and the hierarchal classification, responsive to the condition being triggered for any parameter of the set of parameters, enabling front and rear wheel braking, and responsive to no condition being triggered for the set of parameters, enabling only one of the front or rear wheel braking.

13. The vehicle control system of claim 12, wherein vehicle speed is a first parameter in the hierarchical classification of the set of parameters, and wherein whether the vehicle speed is greater than a speed threshold is the condition for the first parameter.

14. The vehicle control system of claim 13, wherein vehicle weight is a second parameter in the hierarchical classification of the set of parameters, and wherein whether the vehicle weight is greater than a weight threshold is the condition for the second parameter.

15. The vehicle control system of claim 14, wherein the vehicle weight includes determining whether a trailer attachment is operably coupled to the vehicle, and wherein responsive to the trailer attachment being operably coupled to vehicle, the weight threshold is triggered.

16. The vehicle control system of claim 14, wherein a status of a driving surface of the vehicle is a third parameter in the hierarchical classification of the set of parameters, and wherein whether the status of the driving surface is wet or icy is the condition of the third parameter.

17. The vehicle control system of claim 16, wherein whether the status of the driving surface is wet or icy is based on a vehicle mode currently in use by the vehicle.

18. The vehicle control system of claim 16, wherein the status of the driving surface is wet or icy is based on a coefficient of friction of the driving surface.

19. The vehicle control system of claim 16, wherein a road grade is a fourth parameter in the hierarchical classification of the set of parameters, and wherein whether the road grade is greater than a grade threshold is the condition for the fourth parameter.

20. The vehicle control system of claim 19 wherein a brake pedal travel distance is a fifth parameter in the hierarchical classification of the set of parameters, and wherein whether brake pedal travel distance is greater than a pedal distance threshold is the condition for the fifth parameter.

* * * * *